UNITED STATES PATENT OFFICE.

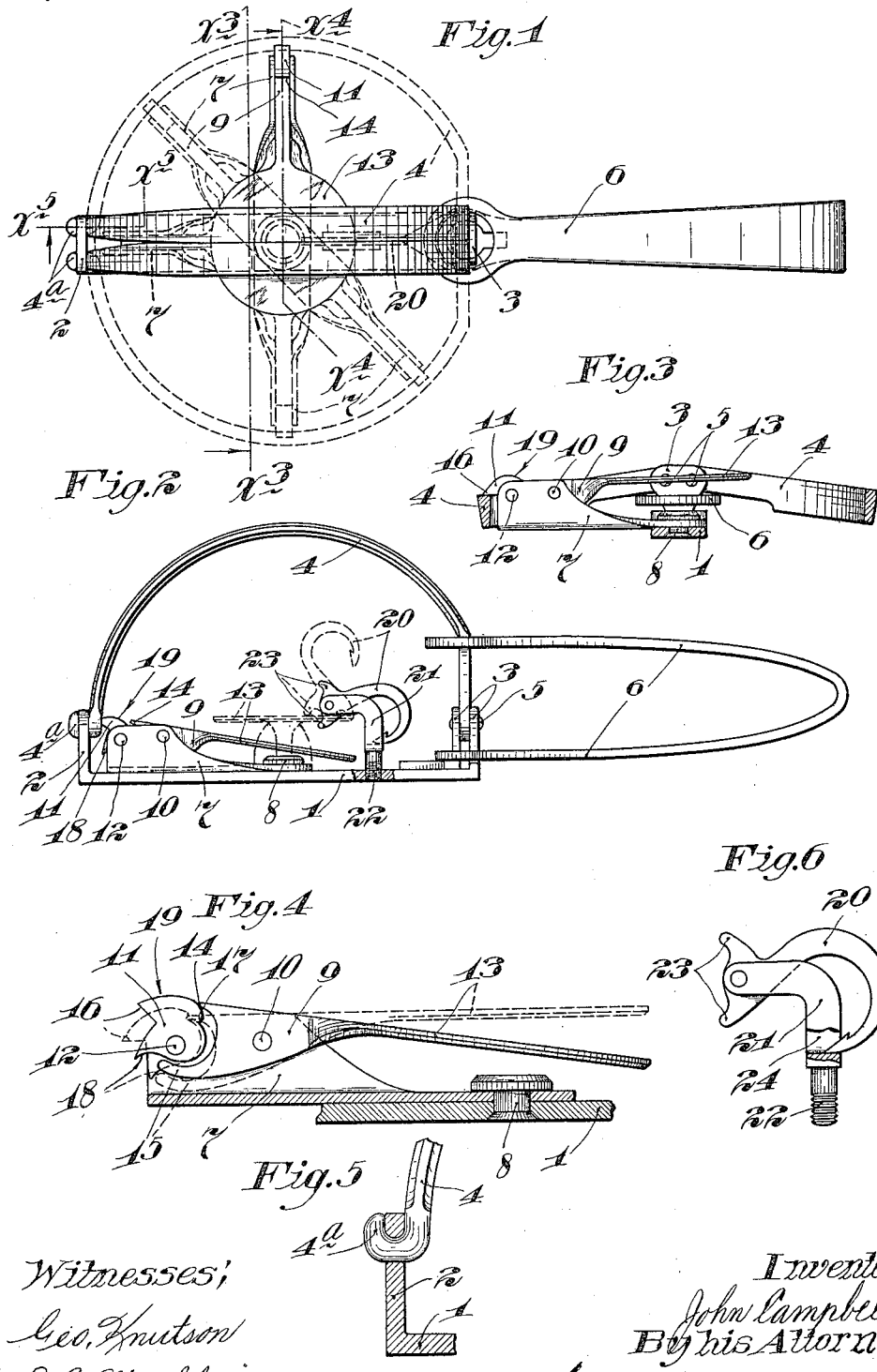

JOHN CAMPBELL, OF MINNEAPOLIS, MINNESOTA, ASSIGNOR OF ONE-HALF TO THOMAS E. McDERMOTT, OF MINNEAPOLIS, MINNESOTA.

ANIMAL-TRAP.

1,150,927. Specification of Letters Patent. Patented Aug. 24, 1915.

Application filed September 16, 1912. Serial No. 720,502.

*To all whom it may concern:*

Be it known that I, JOHN CAMPBELL, a citizen of the United States, residing at Minneapolis in the county of Hennepin and State of Minnesota, have invented certain new and useful Improvements in Animal-Traps; and I do hereby declare the following to be a full, clear, and exact description of the invention, such as will enable others skilled in the art to which it appertains to make and use the same.

My invention has for its object to provide an improved animal trap; and to such ends, generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a plan view of the improved trap; Fig. 2 is a side elevation of the same, with the trigger shown as turned into inoperative position; Fig. 3 is a transverse section taken on the line $x^3$ $x^3$ on Fig. 1, but showing the jaws opened up, and the trap set; Fig. 4 is a vertical section taken on the line $x^4$ $x^4$ on Fig. 1, some parts being broken away, the parts being shown on a larger scale than Figs. 1, 2 and 3; Fig. 5 is a detail in section on the line $x^5$ $x^5$ on Fig. 1; and Fig. 6 is a detail view showing a bait hook attachment removed from the trap and some parts being broken away.

The base of the trap is in the form of a flat bar 1, having, as shown, at one end, a single lug 2, and at its other end a pair of lugs 3.

Trap jaws 4 are pivoted or hinged to the lugs 2 and 3, being preferably provided at one end with hook-like trunnions $4^a$ inserted, with hook-like action, through perforations in the lug 2 and being thereafter pivotally connected to the said lugs 3 at their other ends, by the insertion of pivot pins or rivets 5.

The closing of the jaws 4 is accomplished by the usual heavy U-shaped spring 6 having perforations at its ends, the lower perforated end thereof being inserted over the lugs 3 and the perforated upper end thereof working with a camming action on the adjacent end portions of the said jaws.

At the central portion of the base 1, a trigger supporting arm 7 is pivotally connected at 8, in such manner that it may be pivotally moved in a horizontal plane and swung to either side of the base, in any desired angle thereto, or into alinement with the said base, for an important purpose which will hereinafter more fully appear. As shown, the outer end portion of the arm 7 is a channel-shaped structure and a trigger lever 9 is intermediately pivoted thereto at 10, and a coöperating trigger dog 11 is pivotally connected thereto at 12. At its inner end, the trigger lever 9 is provided with the customary so-called bait pan 13, and at its outer end, as an important feature of this invention, said lever is provided with upper and lower prongs or fingers 14 and 15. For engagement with one of the trap jaws 4, the trigger dog 11 is provided with a shoulder or projection 16, and for engagement, respectively, with the prongs 14 and 15 of the trigger lever 9, said dog is provided with a lock shoulder 17 and a cam lug or surface 18. The upper portion of the lock dog 11 between the shoulder 16 and 17, is round and affords a cam surface 19 with which the upper prong 14 of the trigger lever 9 also engages.

With the above described novel arrangement of the trigger lever and trigger dog, a movement of the inner or pan end 13 of the trigger lever upward will cause the upper prong 14 to engage the cam surface 19 and turn the trigger dog 11, so as to move its shoulder 16 downward for engagement with the adjacent upper edge of the adjacent trap jaw 4, and the lock shoulder 17 into engagement with the said prong 14. On the other hand, downward movement of the pan or inner end 13 of the said trigger lever causes the lower prong 15 to engage the cam surface 18 of the said trigger dog and thereby positively move the same so as to carry its shoulder 16 inward and out of line of closing movement of the coöperating jaw 4. Arrangement whereby both upward and downward movements of the trigger lever produce positive movements of the trigger dog, is thought to be broadly new and is herein claimed from the broadest possible point of view.

The important results accomplished thereby are as follows: In setting the trap, the trigger dog may be properly engaged with the depressed trap jaw and the trigger lever locked to the said dog, simply by placing the hand under one of the jaws and pressing upward on the inner or plate end of the said trigger lever. In the act of tripping the trap, which is, of course, primarily produced by pressing the end 13 of the lever downward or toward the base, such movement of said lever positively moves the trigger dog out of the line of closing movement of the coöperating trap jaw. Otherwise stated, the said trigger dog does not rely on the closing movement of the jaw to force it from working or set position, but positively receives both its setting and releasing movements from movement of the trigger lever. Furthermore, normally, the pan end of the trigger lever being held down by gravity, will normally hold the jaw engaging shoulder 16 of the trigger dog retracted so that it will clear the trap jaws and permit the trigger supporting arm 7 to be freely swung from one side to the other of the base, or into alinement with the base.

In setting the trap in a den or hole, or similar habitation of animals to be trapped, it is always desirable to swing the spring of the trap toward that side of the trap which carries the trigger or setting device, and thereby avoid the necessity of animals passing directly across the spring, as would be necessary if the spring stood in a direct line line with the base. In setting the trap on a narrow ledge or in the runway of an animal, a rock or root may so interfere with the spring toward the setting device that it becomes necessary to swing the trigger or setting device on the opposite side in order to make it possible to properly set the trap in the place desired. The trap is, therefore, universally adjustable to all of the various different conditions encountered by trappers, and enabling the trapper to set the trap always to the best advantage.

When the trap is not in use, the trigger supporting arm is adapted to be swung toward the heel of the trap into alinement with the base 1, as best shown in Fig. 2, and when thus adjusted, the trap is adapted to be conveniently carried and will have no projecting parts that will interfere with the convenience of the carrier. Furthermore, traps thus adjusted are capable of being packed into small space, and hence, economically shipped or stored.

It frequently becomes desirable to hang the trap in a vertical position, as, for instance, on the trunk of a tree, and to provide an efficient bait holder for the trap when thus used, I preferably employ a bait hook 20 pivoted to a laterally projecting end of a threaded stud 21, the threaded shank 22 of which is adapted to be screwed into a threaded seat formed in the base 1, as best shown in Fig. 2. At its pivoted end, the hook 20 is provided with presser lugs 23, and the stud 21 is shown as provided with a perforation 24 within which the barbed end of the hook 20 is adapted to be inserted when the hook is out of use. When the trap is hung vertically, while the stud 21 is applied, as shown in Fig. 2, the trap being set, and the hook 20 being adjusted, as shown by dotted lines in said Fig. 2, the bait is applied to the barbed end of the said hook, and the lower lug 23 of the said hook will then bear against the pan or inner end of the tripping lever 9. The trap will then be tripped whenever the animal, in attempting to get the bait, moves the hook 20 either upward or downward. Such movement of the hook, as is evident, will press the pan 13 toward the base and trip the trap.

By turning the offset end of the stud 21 ninety degrees in either direction from the position shown in Fig. 2, the bait hook attachment will be thrown into an inoperative position. When, however, its use is not desired, it should be removed from the trap.

Attention is also called to the important fact that the hook-like trunnions 4 of the trap jaws hold the heel of the trap jaws positively interlocked to the trap base, so that they cannot be accidently disconnected therefrom, by a blow or force applied to the heel ends thereof intended to force the same inward. In prior traps where single trunnions have been employed, the trap jaws have quite frequently been sprung loose from the base by a club used by a trapper in attempting to kill or subdue an animal caught in the trap.

What I claim is:

1. A trap comprising a base, spring actuated jaws, a trigger dog operative on one of the jaws, and a trigger lever operative on said dog to impart positive movements thereto in both directions.

2. A trap comprising a base, a pair of spring actuated jaws connected thereto, a trigger dog operative on one of the said jaws, and a trigger lever having upper and lower prongs operative on said dog to positively move the same in both directions, and the said dog having a lock shoulder engageable with one of the prongs of said lever.

3. A trap comprising a base, a pair of spring actuated jaws connected to said base, a trigger dog having upper and lower cam surfaces, a lock shoulder and a jaw engaging lug, and an intermediately pivoted trigger lever having upper and lower prongs operative, respectively, on the upper and lower cam surfaces of said dog to positively move said dog in both directions, and one of the said lever prongs being engageable with the lock shoulder of said dog.

In testimony whereof I affix my signature in presence of two witnesses.

JOHN CAMPBELL.

Witnesses:
F. D. MERCHANT,
HARRY D. KILGORE.

Copies of this patent may be obtained for five cents each, by addressing the "Commissioner of Patents, Washington, D. C."